US009939930B2

(12) United States Patent
Bell

(10) Patent No.: US 9,939,930 B2
(45) Date of Patent: Apr. 10, 2018

(54) ACTIVE STYLUS WITH MULTIPLE SENSORS FOR RECEIVING SIGNALS FROM A TOUCH SENSOR

(71) Applicant: Atmel Corporation, San Jose, CA (US)

(72) Inventor: Thomas Bell, Fareham (GB)

(73) Assignee: Atmel Corporation, Chandler, AZ (US)

( * ) Notice: Subject to any disclaimer, the term of this patent is extended or adjusted under 35 U.S.C. 154(b) by 7 days.

(21) Appl. No.: 15/177,846

(22) Filed: Jun. 9, 2016

(65) Prior Publication Data
US 2017/0357338 A1 Dec. 14, 2017

(51) Int. Cl.
*G06F 3/0354* (2013.01)
*G06F 3/041* (2006.01)
*G06F 3/044* (2006.01)
*G06F 3/038* (2013.01)

(52) U.S. Cl.
CPC ........ *G06F 3/03545* (2013.01); *G06F 3/0383* (2013.01); *G06F 3/044* (2013.01); *G06F 3/0414* (2013.01); *G06F 3/0416* (2013.01); *G06F 2203/04102* (2013.01); *G06F 2203/04107* (2013.01); *G06F 2203/04112* (2013.01)

(58) Field of Classification Search
CPC ....... G06F 3/03545; G06F 3/041; G06F 3/044
USPC ............................... 345/173, 179; 178/19.01
See application file for complete search history.

(56) References Cited

U.S. PATENT DOCUMENTS

| 3,958,234 | A | * | 5/1976 | Hoo ..................... G06F 3/044 178/19.01 |
|---|---|---|---|---|
| 7,663,607 | B2 | | 2/2010 | Hotelling |
| 7,864,503 | B2 | | 1/2011 | Chang |
| 7,875,814 | B2 | | 1/2011 | Chen |
| 7,920,129 | B2 | | 4/2011 | Hotelling |
| 8,031,094 | B2 | | 10/2011 | Hotelling |
| 8,031,174 | B2 | | 10/2011 | Hamblin |
| 8,040,326 | B2 | | 10/2011 | Hotelling |
| 8,049,732 | B2 | | 11/2011 | Hotelling |
| 8,179,381 | B2 | | 5/2012 | Frey |
| 8,217,902 | B2 | | 7/2012 | Chang |
| 8,723,824 | B2 | | 5/2014 | Myers |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Koosha Sharifi-Tafreshi
(74) *Attorney, Agent, or Firm* — Baker Botts L.L.P.

(57) ABSTRACT

In one embodiment, a stylus includes a first sensor disposed proximate a first end of the stylus. The first sensor is adapted to receive a first receive signal via a first capacitive coupling with a touch sensor of a device. The first end of the stylus is at a tip-end of the stylus. The stylus also includes a second sensor disposed proximate the first end of the stylus. The second sensor is adapted to receive a second receive signal via a second capacitive coupling with the touch sensor of the device. A proximity of the first sensor to the first end of the stylus is greater than a proximity of the second sensor to the first end of the stylus. A widest portion of the first sensor has a greater width than at least a portion of the second sensor.

18 Claims, 9 Drawing Sheets

(56) References Cited

U.S. PATENT DOCUMENTS

| | | |
|---|---|---|
| 2008/0309635 A1 | 12/2008 | Matsuo |
| 2009/0315854 A1 | 12/2009 | Matsuo |
| 2011/0304577 A1* | 12/2011 | Brown ................ G06F 3/03545 |
| | | 345/174 |
| 2012/0154340 A1* | 6/2012 | Vuppu .................... G06F 3/044 |
| | | 345/179 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2013/0106798 A1* | 5/2013 | Sundara-Rajan ..... G06F 3/0383 |
| | | 345/179 |
| 2017/0068337 A1* | 3/2017 | Bhandari ................ G06F 3/044 |

* cited by examiner

ACTIVE STYLUS WITH MULTIPLE SENSORS FOR RECEIVING SIGNALS FROM A TOUCH SENSOR

TECHNICAL FIELD OF THE INVENTION

The present invention generally relates to touch sensors.

BACKGROUND

In an example scenario, a touch sensor detects the presence and position of an object (e.g., a user's finger or a stylus) within a touch-sensitive area of touch sensor array overlaid on a display screen, for example. In a touch-sensitive-display application, a touch sensor array allows a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other appropriate device. A control panel on a household or other appliance may include a touch sensor.

There are a number of different types of touch sensors, such as (for example) resistive touch sensors, surface acoustic wave touch sensors, and capacitive touch sensors. In one example, when an object physically touches a touch screen within a touch-sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance may occur within the touch screen at a position of the touch sensor of the touch screen that corresponds to the position of the object within the touch sensitive area of the touch sensor. A touch sensor controller may process the change in capacitance to determine the position of the change of capacitance within the touch sensor (e.g., within a touch sensor array of the touch sensor).

BRIEF DESCRIPTION OF THE DRAWINGS

To provide a more complete understanding of the present disclosure and the features and advantages thereof, reference is made to the following description taken in conjunction with the accompanying drawings, in which.

DESCRIPTION OF EXAMPLE EMBODIMENTS

Figure 1:
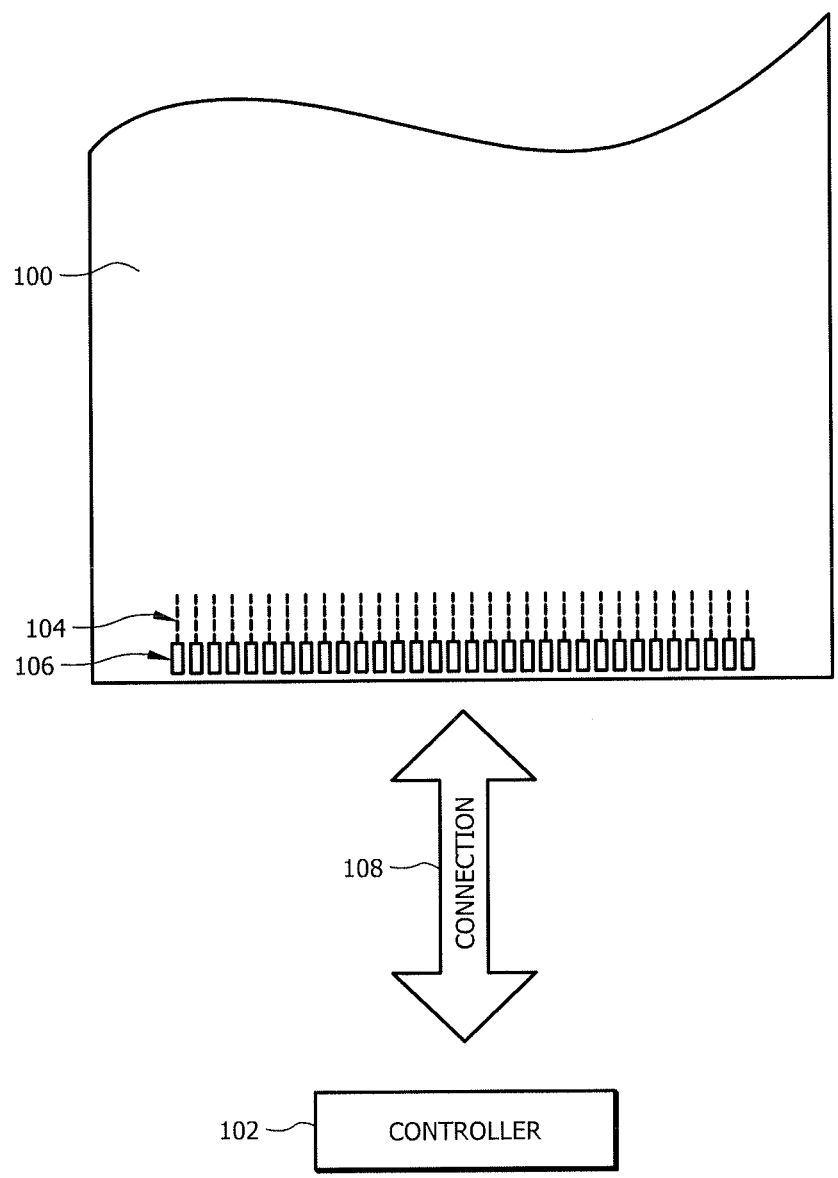
FIG. 1 illustrates an example touch sensor array with an example touch sensor controller according to an embodiment of the present disclosure.

When a stylus is used in conjunction with a device incorporating a capacitive touch sensor, the stylus typically receives signals from the touch sensor in order to enable communication between the stylus and the touch sensor. For example, the stylus may receive a synchronization signal from the touch sensor. However, the user's interactions with the device while holding the stylus (such as touching the edges of the device or placing a palm on the touch sensor) may cause the stylus to pick up interfering signals. For example, because a user may be holding the outer body of the stylus, the user may inject signals into the local ground of the stylus, such as signals generated by the touch sensor.

The present disclosure provides an apparatus and method to receive and process signals from the touch sensor even in scenarios where the user couples signals into the stylus ground. For example, in one embodiment, the stylus includes two receive electrodes to receive signals from the touch sensor, each having a different degree of capacitive coupling to the touch sensor. The stylus also includes a differential amplifier which takes the received signal from both receive electrodes as an input and produces an output signal that amplifies the difference between the two received signals.

In certain embodiments, the use of a differential amplifier connected to two receiver electrodes may provide certain advantages as compared to use of an amplifier connected to a single receive electrode referenced against the local ground of active stylus. In a design where the local ground of the stylus is used as a negative reference for the amplifier, a signal injected into the local ground of the stylus may reduce or invert the amplifier's output signal because the injected signal would essentially be subtracted from the single receive electrode signal. By contrast, using the differential amplifier, the local stylus ground is not used as an input. Therefore, the output of the differential amplifier should be largely unaffected by signals injected into local ground of active stylus by a user holding the stylus. Furthermore, because the differential amplifier amplifies the difference between the signals from the two receiver electrodes, any noise or interference common to both electrodes should be substantially reduced or cancelled.

In one embodiment, a stylus includes a first sensor disposed proximate a first end of the stylus. The first sensor is adapted to receive a first receive signal via a first capacitive coupling with a touch sensor of a device. The first end of the stylus is at a tip-end of the stylus. The stylus also includes a second sensor disposed proximate the first end of the stylus. The second sensor is adapted to receive a second receive signal via a second capacitive coupling with the touch sensor of the device. A proximity of the first sensor to the first end of the stylus is greater than a proximity of the second sensor to the first end of the stylus. A widest portion of the first sensor has a greater width than at least a portion of the second sensor.

FIG. 1 illustrates an example touch sensor array with an example touch sensor controller according to an embodiment of the present disclosure. Touch sensor array 100 and touch sensor controller 102 detect the presence and position of a touch or the proximity of an object within a touch-sensitive area of touch sensor array 100. Reference to a touch sensor array may encompass both touch sensor array 100 and its touch sensor controller. Similarly, reference to a touch sensor controller may encompass both touch sensor controller 102 and its touch sensor array. Touch sensor array 100 includes one or more touch-sensitive areas. In one embodiment, touch sensor array 100 includes an array of electrodes disposed on one or more substrates, which may be made of a dielectric material. Reference to a touch sensor array may encompass both the electrodes of touch sensor array 100 and the substrate(s) on which they are disposed. Alternatively, reference to a touch sensor array may encompass the electrodes of touch sensor array 100, but not the substrate(s) on which they are disposed.

In one embodiment, an electrode is an area of conductive material forming a shape, such as for example a disc, square, rectangle, thin line, other shape, or a combination of these shapes. One or more cuts in one or more layers of conductive material may (at least in part) create the shape of an electrode, and the area of the shape may (at least in part) be bounded by those cuts. In one embodiment, the conductive material of an electrode occupies approximately 100% of the area of its shape. For example, an electrode may be made of indium tin oxide (ITO) and the ITO of the electrode may occupy approximately 100% of the area of its shape (sometimes referred to as 100% fill). In one embodiment, the conductive material of an electrode occupies less than 100% of the area of its shape. For example, an electrode may be made of fine lines of metal or other conductive material (FLM), such as for example copper, silver, or a copper- or silver-based material, and the fine lines of conductive material may occupy approximately 5% of the area of its shape in a hatched, mesh, or other pattern. Reference to FLM encompasses such material. Although this disclosure describes or illustrates particular electrodes made of particular conductive material forming particular shapes with particular fill percentages having particular patterns, this disclosure contemplates electrodes made of other conductive materials forming other shapes with other fill percentages having other patterns.

The shapes of the electrodes (or other elements) of a touch sensor array 100 constitute, in whole or in part, one or more macro-features of touch sensor array 100 array 10. One or more characteristics of the implementation of those shapes (such as, for example, the conductive materials, fills, or patterns within the shapes) constitute in whole or in part one or more micro-features of touch sensor array 100. One or more macro-features of a touch sensor array 100 may determine one or more characteristics of its functionality, and one or more micro-features of touch sensor array 100 may determine one or more optical features of touch sensor array 100, such as transmittance, refraction, or reflection.

Although this disclosure describes a number of example electrodes, the present disclosure is not limited to these example electrodes and other electrodes may be implemented. Additionally, although this disclosure describes a number of example embodiments that include particular configurations of particular electrodes forming particular nodes, the present disclosure is not limited to these example embodiments and other configurations may be implemented. In one embodiment, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns may be implemented.

A mechanical stack contains the substrate (or multiple substrates) and the conductive material forming the electrodes of touch sensor array 100. For example, the mechanical stack may include a first layer of optically clear adhesive (OCA) beneath a cover panel. The cover panel may be clear and made of a resilient material for repeated touching, such as for example glass, polycarbonate, or poly(methyl methacrylate) (PMMA). This disclosure contemplates cover panel being made of any material. The first layer of OCA may be disposed between the cover panel and the substrate with the conductive material forming the electrodes. The mechanical stack may also include a second layer of OCA and a dielectric layer (which may be made of PET or another material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 100 and touch sensor controller 102. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates other mechanical stacks with any number of layers made of any materials and having any thicknesses. For example, in one embodiment, a layer of adhesive or dielectric may replace the dielectric layer, second layer of OCA, and air gap described above, with there being no air gap in the display.

One or more portions of the substrate of touch sensor array 100 may be made of polyethylene terephthalate (PET) or another material. This disclosure contemplates any substrate with portions made of any material(s). In one embodiment, one or more electrodes in touch sensor array 100 are made of ITO in whole or in part. Additionally or alternatively, one or more electrodes in touch sensor array 100 are made of fine lines of metal or other conductive material. For example, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any electrodes made of any materials.

In one embodiment, touch sensor array 100 implements a capacitive form of touch sensing. In a mutual-capacitance implementation, touch sensor array 100 may include an array of drive and sense electrodes forming an array of capacitive nodes. A drive electrode and a sense electrode may form a capacitive node. The drive and sense electrodes forming the capacitive node are positioned near each other but do not make electrical contact with each other. Instead, in response to a signal being applied to the drive electrodes for example, the drive and sense electrodes capacitively couple to each other across a space between them. A pulsed or alternating voltage applied to the drive electrode (by touch sensor controller 102) induces a charge on the sense electrode, and the amount of charge induced is susceptible to external influence (such as a touch or the proximity of an object). When an object touches or comes within proximity of the capacitive node, a change in capacitance may occur at the capacitive node and touch sensor controller 102 measures the change in capacitance. By measuring changes in capacitance throughout the array, touch sensor controller 102 determines the position of the touch or proximity within touch-sensitive areas of touch sensor array 100.

In a self-capacitance implementation, touch sensor array 100 may include an array of electrodes of a single type that may each form a capacitive node. When an object touches or comes within proximity of the capacitive node, a change in self-capacitance may occur at the capacitive node and touch sensor controller 102 measures the change in capacitance, for example, as a change in the amount of charge implemented to raise the voltage at the capacitive node by a pre-determined amount. As with a mutual-capacitance implementation, by measuring changes in capacitance throughout the array, touch sensor controller 102 determines the position of the touch or proximity within touch-sensitive areas of touch sensor array 100. This disclosure contemplates any form of capacitive touch sensing.

In one embodiment, one or more drive electrodes together form a drive line running horizontally or vertically or in other orientations. Similarly, in one embodiment, one or more sense electrodes together form a sense line running horizontally or vertically or in other orientations. As one particular example, drive lines run substantially perpendicular to the sense lines. Reference to a drive line may encompass one or more drive electrodes making up the drive line, and vice versa. Reference to a sense line may encompass one or more sense electrodes making up the sense line, and vice versa.

In one embodiment, touch sensor array 100 includes drive and sense electrodes disposed in a pattern on one side of a single substrate. In such a configuration, a pair of drive and sense electrodes capacitively coupled to each other across a space between them form a capacitive node. As an example self-capacitance implementation, electrodes of a single type are disposed in a pattern on a single substrate. In addition or as an alternative to having drive and sense electrodes disposed in a pattern on one side of a single substrate, touch sensor array 100 may have drive electrodes disposed in a pattern on one side of a substrate and sense electrodes disposed in a pattern on another side of the substrate. Moreover, touch sensor array 100 may have drive electrodes disposed in a pattern on one side of one substrate and sense electrodes disposed in a pattern on one side of another substrate. In such configurations, an intersection of a drive electrode and a sense electrode forms a capacitive node. Such an intersection may be a position where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates other configurations of electrodes forming nodes. Moreover, this disclosure contemplates other electrodes disposed on any number of substrates in any patterns.

As described above, a change in capacitance at a capacitive node of touch sensor array 100 may indicate a touch or proximity input at the position of the capacitive node. Touch sensor controller 102 detects and processes the change in capacitance to determine the presence and position of the touch or proximity input. In one embodiment, touch sensor controller 102 then communicates information about the touch or proximity input to one or more other components (such as one or more central processing units (CPUs)) of a device that includes touch sensor array 100 and touch sensor controller 102, which may respond to the touch or proximity input by initiating a function of the device (or an application running on the device). Although this disclosure describes a particular touch sensor controller having particular functionality with respect to a particular device and a particular touch sensor, this disclosure contemplates any other touch sensor controllers having any functionality with respect to any device and any touch sensor.

In one embodiment, touch sensor controller 102 is implemented as one or more integrated circuits (ICs), such as for example general-purpose microprocessors, microcontrollers, programmable logic devices or arrays, application-specific ICs (ASICs). Touch sensor controller 102 comprises any combination of analog circuitry, digital logic, and digital non-volatile memory. In one embodiment, touch sensor controller 102 is disposed on a flexible printed circuit (FPC) bonded to the substrate of touch sensor array 100, as described below. The FPC may be active or passive. In one embodiment, multiple touch sensor controllers 102 are disposed on the FPC.

In an example implementation, touch sensor controller 102 includes a processor unit, a drive unit, a sense unit, and a storage unit. In such an implementation, the drive unit supplies drive signals to the drive electrodes of touch sensor array 100, and the sense unit senses charge at the capacitive nodes of touch sensor array 100 and provides measurement signals to the processor unit representing capacitances at the capacitive nodes. The processor unit controls the supply of drive signals to the drive electrodes by the drive unit and process measurement signals from the sense unit to detect and process the presence and position of a touch or proximity input within touch-sensitive areas of touch sensor array 100. The processor unit may also track changes in the position of a touch or proximity input within touch-sensitive areas of touch sensor array 100. The storage unit stores programming for execution by the processor unit, including programming for controlling the drive unit to supply drive signals to the drive electrodes, programming for processing measurement signals from the sense unit, and other programming. Although this disclosure describes a particular touch sensor controller having a particular implementation with particular components, this disclosure contemplates touch sensor controller having other implementations with other components.

Tracks 104 of conductive material disposed on the substrate of touch sensor array 100 couple the drive or sense electrodes of touch sensor array 100 to connection pads 106, also disposed on the substrate of touch sensor array 100. As described below, connection pads 106 facilitate coupling of tracks 104 to touch sensor controller 102. Tracks 104 may extend into or around (e.g., at the edges of) touch-sensitive areas of touch sensor array 100. In one embodiment, particular tracks 104 provide drive connections for coupling touch sensor controller 102 to drive electrodes of touch sensor array 100, through which the drive unit of touch sensor controller 102 supplies drive signals to the drive electrodes, and other tracks 104 provide sense connections for coupling touch sensor controller 102 to sense electrodes of touch sensor array 100, through which the sense unit of touch sensor controller 102 senses charge at the capacitive nodes of touch sensor array 100.

Tracks 104 are be made of fine lines of metal or other conductive material. For example, the conductive material of tracks 104 may be copper or copper-based and have a width of approximately 100 µm or less. As another example, the conductive material of tracks 104 may be silver or silver-based and have a width of approximately 100 µm or less. In one embodiment, tracks 104 are made of ITO in whole or in part in addition or as an alternative to the fine lines of metal or other conductive material. Although this disclosure describes particular tracks made of particular materials with particular widths, this disclosure contemplates tracks made of other materials and/or other widths. In addition to tracks 104, touch sensor array 100 may include one or more ground lines terminating at a ground connector (which may be a connection pad 106) at an edge of the substrate of touch sensor array 100 (similar to tracks 104).

Connection pads 106 may be located along one or more edges of the substrate, outside touch-sensitive areas of touch sensor array 100. As described above, touch sensor controller 102 may be on an FPC. Connection pads 106 may be made of the same material as tracks 104 and may be bonded to the FPC using an anisotropic conductive film (ACF). In one embodiment, connection 108 include conductive lines on the FPC coupling touch sensor controller 102 to connection pads 106, in turn coupling touch sensor controller 102 to tracks 104 and to the drive or sense electrodes of touch sensor array 100. In another embodiment, connection pads 106 are connected to an electro-mechanical connector (such as a zero insertion force wire-to-board connector); in this embodiment, connection 108 may not include an FPC, if desired. This disclosure contemplates any connection 108 between touch sensor controller 102 and touch sensor array 100.

Figure 2:
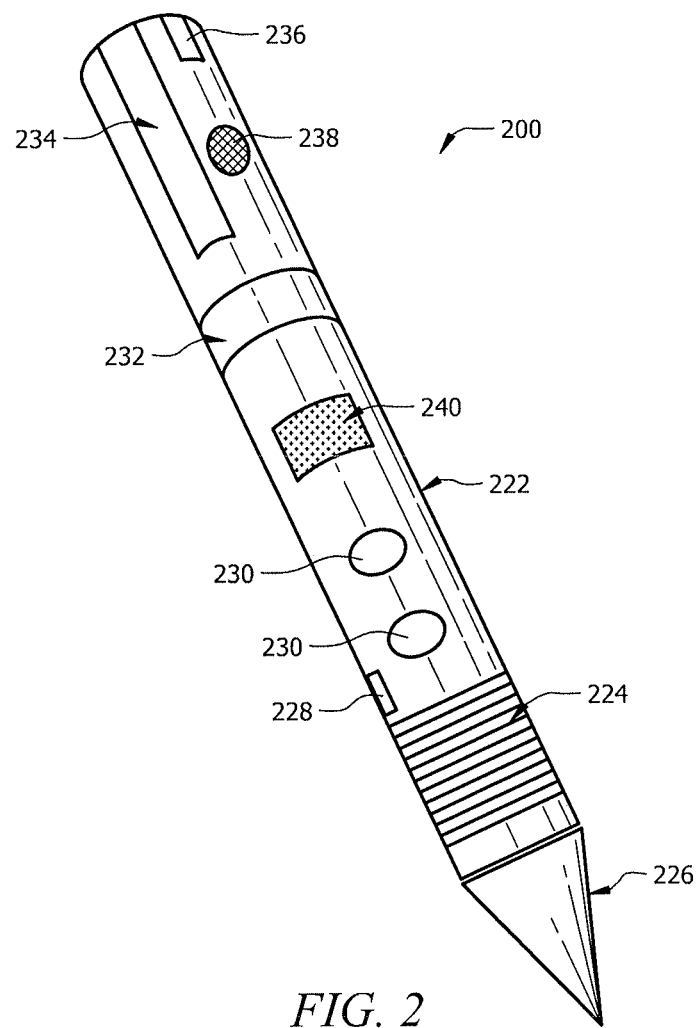
FIG. 2 illustrates an example active stylus according to an embodiment of the present disclosure.

FIG. 2 illustrates an example exterior of an example active stylus 200. In an embodiment, active stylus 200 is powered (e.g., by an internal or external power source) and is capable of providing touch or proximity inputs to a touch sensor (e.g., touch sensor 100 illustrated in FIG. 1). Exemplary active stylus 200 includes one or more components, such as buttons 230 or sliders 232 and 234 integrated with an outer body 222. These external components provide for interaction between active stylus 200 and a user or between a device and a user. As an example and not by way of limitation, interactions include communication between active stylus 200 and a device, enabling or altering functionality of active stylus 200 or a device, or providing feedback to or accepting input from one or more users. The device can be any suitable device, such as, for example and without limitation, a desktop computer, laptop computer, tablet computer, personal digital assistant (PDA), smart-phone, satellite navigation device, portable media player, portable game console, kiosk computer, or point-of-sale device. Although this disclosure provides specific examples of particular components configured to provide particular interactions, this disclosure contemplates any suitable component configured to provide any suitable interaction. Active stylus 200 can have any suitable dimensions with outer body 222 made of any suitable material or combination of materials, such as, for example and without limitation, plastic or metal. In an embodiment, exterior components (e.g. 230 or 232) of active stylus 20 interact with internal components or programming of active stylus 200 and initiate one or more interactions with one or more devices or other active styluses 200.

As described above, in an embodiment, actuating one or more particular components initiates an interaction between active stylus 200 and a user or between the device and the user. Components of exemplary active stylus 200 include one or more buttons 230 or one or more sliders 232 and 234. As an example and not by way of limitation, buttons 230 or sliders 232 and 234 can be mechanical or capacitive and can function as a roller, trackball, or wheel. As another example, one or more sliders 232 or 234 can function as a vertical slider 234 aligned along a longitudinal axis of active stylus 200, while one or more wheel sliders 232 can be aligned around the circumference of active stylus 200. In an embodiment, capacitive sliders 232 and 234 and buttons 230 are implemented using one or more touch-sensitive areas. Touch-sensitive areas can have any suitable shape, dimensions, location, or be made from any suitable material. As an example and not by way of limitation, sliders 232 and 234 or buttons 230 are implemented using areas of flexible mesh formed using lines of conductive material. As another example, sliders 232 and 234 or buttons 230 are implemented using a FPC.

Exemplary active stylus 200 has one or more components configured to provide feedback to or accepting feedback from a user, such as, for example and without limitation, tactile, visual, or audio feedback. In an embodiment, active stylus 200 includes one or more ridges or grooves 224 on its outer body 222. Ridges or grooves 224 can have any suitable dimensions, have any suitable spacing between ridges or grooves, or be located at any suitable area on outer body 222 of active stylus 200. As an example and not by way of limitation, ridges 224 enhance a user's grip on outer body 222 of active stylus 200 and provide tactile feedback to or accept tactile input from a user. In an embodiment, active stylus 200 includes one or more audio components 238 capable of transmitting and receiving audio signals. As an example and not by way of limitation, audio component 238 contains a microphone capable of recording or transmitting one or more users' voices. As another example, audio component 238 provides an auditory indication of a power status of active stylus 200. In an embodiment, active stylus 200 includes one or more visual feedback components 236, such as a light-emitting diode (LED) indicator or electro-phoretic ink (E-Ink). As an example and not by way of limitation, visual feedback component 236 indicates a power status of active stylus 200 to the user.

In the depicted embodiment, one or more modified surface areas 240 form one or more components on outer body 222 of active stylus 200. In this example, properties of modified surface areas 240 are different than properties of the remaining surface of outer body 222. As an example and not by way of limitation, modified surface area 240 can be modified to have a different texture, temperature, or electromagnetic characteristic relative to the surface properties of the remainder of outer body 222. As another example, modified surface area 240 is capable of dynamically altering its properties, for example by using haptic interfaces or rendering techniques. A user may interact with modified surface area 240 to provide any suitable functionally. For example and not by way of limitation, dragging a finger across modified surface area 240 can initiate an interaction, such as data transfer, between active stylus 200 and a device.

One or more components of active stylus 200 are configured to communicate data between active stylus 200 and the device. For example, active stylus 200 includes one or more tips 226 or nibs. Tip 226 includes one or more sensors configured to communicate data between active stylus 200 and one or more devices or other active styluses. In an embodiment, tip 226 houses multiple sensors. For example, tip 226 can include two electrodes for receiving signals from a touch sensor, and one electrode for transmitting signals to a touch sensor. Example sensors of tip 226 are described in more detail in connection with FIG. 5. In an embodiment, tip 26 provides or communicates pressure information (e.g., the amount of pressure being exerted by active stylus 200 through tip 226) between active stylus 200 and one or more devices or other active styluses. Tip 226 may be made of any suitable material, such as a conductive material, and have any suitable dimensions, such as, for example, a diameter of 1 mm or less at its terminal end.

Exemplary active stylus 200 includes one or more ports 228 located at suitable locations on outer body 222 of active stylus 200. In an embodiment, port 228 is configured to transfer signals or information between active stylus 200 and one or more devices or power sources via, for example, wired coupling. Port 228 can transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 200.

Figure 3:
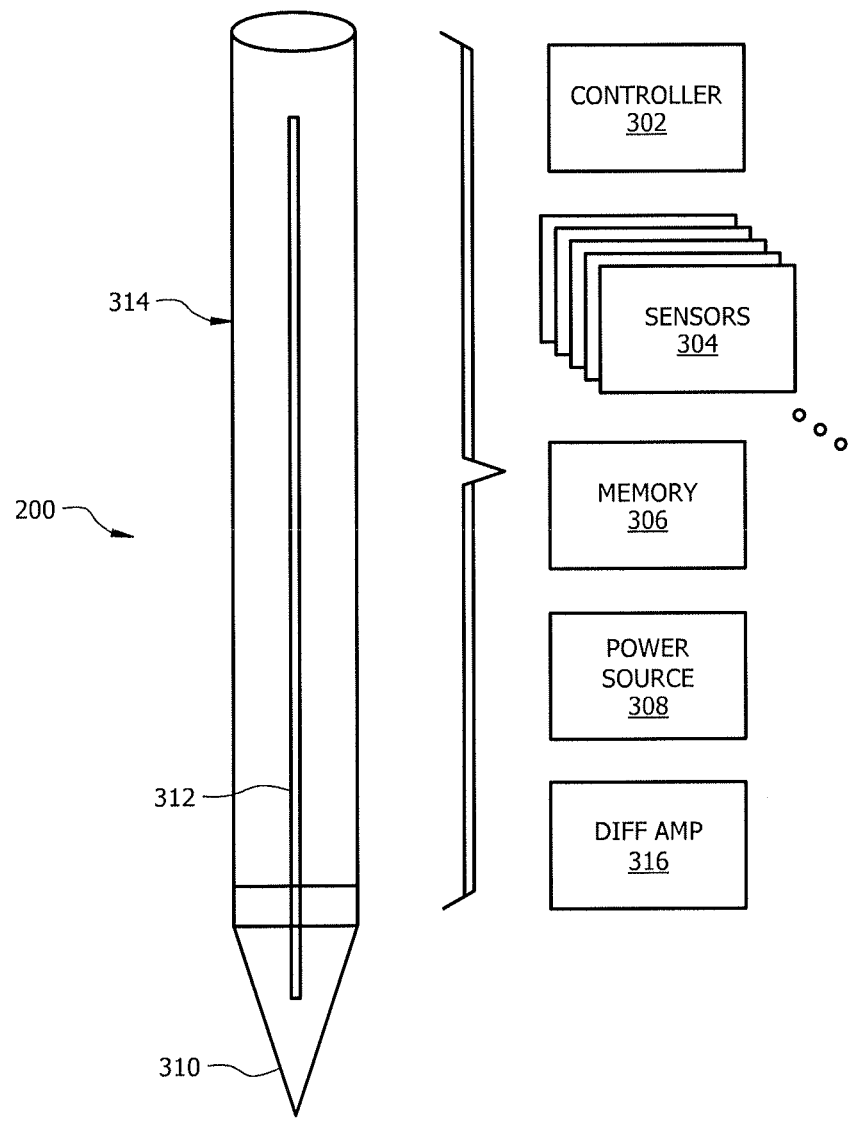
FIG. 3 illustrates example components of an active stylus according to an embodiment of the present disclosure.

FIG. 3 illustrates example components of an active stylus 200 according to an embodiment of the present disclosure. Active stylus 200 includes one or more components, such as controller 302, sensors 304, memory 306, power source 308, and differential amplifier 316. In one embodiment, one or more components are configured to provide for interaction between active stylus 200 and a user or between a device and a user. For example, interactions include communication between active stylus 200 and a device, enabling or altering functionality of active stylus 200 or a device, or providing feedback to or accepting input from one or more users. As another example, active stylus 200 may communicate via any applicable short distance, low energy data transmission or modulation link, such as, for example, via a radio frequency (RF) communication link. In that implementation case, active stylus 200 includes a RF device for transmitting data over the RF link.

In one embodiment, differential amplifier 316 is coupled to two electrodes housed in stylus tip 310. Each of the two electrodes is adapted to receive signals from a touch sensor via a capacitive coupling between the touch sensor and the electrode. As one example, the electrodes may receive a synchronization signal from the touch sensor, described in more detail in connection with FIG. 4. The differential amplifier includes one or more digital or analog circuit elements that takes the signals received at the two electrodes as inputs and produces an output signal that amplifies the difference between the two input signals. For example, differential amplifier 316 may use an op-amp taking the signal from the first electrode as a positive reference and the signal from the second electrode as a negative reference. The output signal is then supplied to controller 302 for processing. In an embodiment, the differential amplifier also filters the output signal using, for example, a bandpass filter. The filtering may help to reject any noise which is not cancelled by the differential amplifier. In an alternative embodiment, any necessary filtering is performed by controller 302.

In certain embodiments, the use of differential amplifier 316 connected to two receiver electrodes may provide certain advantages as compared to use of an amplifier connected to a single receiver electrode referenced against the local ground of active stylus 200. Because a user may be holding the outer body of active stylus 200, the user may inject signals into the local ground of active stylus 200, such as signals generated by a device including a touch sensor. This is especially likely when the user is simultaneously touching active stylus 200 and the device, as described in more detail in FIG. 4. In a design where the local ground of active stylus 200 is used as a negative reference for the amplifier, the injected signal may reduce or invert the amplifier's output signal because the injected signal would essentially be subtracted from the single receiver electrode signal. By contrast, using differential amplifier 316, the local stylus ground is not used as an input. Therefore, the output of differential amplifier should be largely unaffected by signals injected into local ground of active stylus 200 by a user holding the stylus. Furthermore, because differential amplifier 316 amplifies the difference between the signals from the two receiver electrodes, any noise or interference common to both electrodes should be substantially reduced or cancelled.

In certain embodiments, it may be desirable to optimize the characteristics of the two receiver electrodes to obtain certain capacitive coupling relationships. As one example, it may be desirable to have the first receiver electrode (which is used as the positive reference for differential amplifier 316) have a larger signal magnitude than the second receiver electrode (which is used as the negative reference for differential amplifier 316). If the two were equal in magnitude, the signals would cancel entirely when applied to differential amplifier 316. On the other hand, the larger the difference between the magnitude of the two signals, the larger will be the magnitude of the resulting output signal from differential amplifier 316. In the case of a signal from the touch sensor, to accomplish this result, the capacitive coupling between the first receiver electrode and the touch sensor should have a greater capacitance than the capacitive coupling between the second receiver electrode. This and other capacitive coupling relationships of the two receiver electrodes are described in more detail in connection with FIG. 5.

In one embodiment, controller 302 is implemented as a microcontroller or another type of processor for controlling the operation of active stylus 200. As a particular example, controller 302 is implemented as one or more ICs—such as, for example, general-purpose microprocessors, microcontrollers, PLDs, PLAs, or ASICs. In an example implementation, controller 302 includes a processor unit, a drive unit, a sense unit, and a storage unit. The drive unit supplies signals to electrodes of tip 310 through center shaft 312. The drive unit may also supply signals to control or drive sensors 304 or one or more external components of active stylus 200. In one embodiment, the drive unit of active stylus 200 is configured to continuously (or at other time intervals or in response to other events) transmit a signal that may be detected by electrodes of touch sensor array 100. For example, the drive unit of active stylus 200 may include a voltage pump, an oscillator, or a switch, such that the voltage pump may generate a high voltage signal, the oscillator may generate a waveform such as a square wave or a sine wave, or the switch may toggle the potential of tip 310 between zero voltage and a maximum voltage. The drive unit of active stylus 200 may transmit a signal, such as a square wave or sine wave, that may be sensed by the electrodes.

The sense unit obtains signals received by sensors housed in tip 310 from differential amplifier 316 via center shaft 312 and provides measurement signals to the processor unit representing input from a device. The sense unit may also sense signals generated by sensors 304 or one or more external components and provide measurement signals to the processor unit representing input from a user. The processor unit controls the supply of signals to the electrodes of tip 310 and processes measurement signals from the sense unit to detect and process input from the device. The processor unit also decodes information encoded in signals generated by a touch sensor. For example, the processor unit processes a header generated by a touch sensor in order to synchronize communications between the stylus and the touch sensor, as described in more detail in connection with FIG. 4.

The processor unit may also process measurement signals from sensors 304 or one or more external components. The storage unit stores programming for execution by the processor unit, including programming for controlling the drive unit to supply signals to the electrodes of tip 310, programming for processing measurement signals from the sense unit corresponding to input from the device, programming for processing measurement signals from sensors 304 or external components to initiate a pre-determined function or gesture to be performed by active stylus 200 or the device, and other programming. For example, programming executed by controller 302 may electronically filter signals received from the sense unit. Although this disclosure describes a particular controller 302 having a particular implementation with particular components, this disclosure contemplates any controller having any implementation with any components.

In one embodiment, active stylus 200 includes one or more sensors 304, such as touch sensors, gyroscopes, accelerometers, contact sensors, or any other type of sensors that detect or measure data about the environment in which active stylus 200 operates. Sensors 304 may detect and measure one or more characteristic of active stylus 200, such as acceleration or movement, orientation, contact, pressure on outer body 314, force on tip 310, vibration, or any other characteristic of active stylus 200. For example, sensors 304 may be implemented mechanically, electronically, or capacitively. As described above, data detected or measured by sensors 304 communicated to controller 302 may initiate a pre-determined function or gesture to be performed by active stylus 200 or the device. In one embodiment, data detected or received by sensors 304 may be stored in memory 306. Memory 306 is any form of memory for storing data in active stylus 200. Controller 302 may access data stored in memory 306. For example, memory 306 may store programming for execution by the processor unit of controller 302. As another example, data measured by sensors 304 may be processed by controller 302 and stored in memory 306.

Power source 308 is any type of stored-energy source, including electrical or chemical-energy sources, for powering the operation of active stylus 200. In one embodiment, power source 308 is charged with energy from a user or device. For example, power source 308 may be a rechargeable battery that is charged by motion induced on active stylus 200. In other particular embodiments, power source 308 of active stylus 200 provides power to or receives power from the device or other external power source. For example, power may be inductively transferred between power source 308 and a power source of the device or other external power source, such as a wireless power transmitter. Additionally or alternatively, power source 308 may be powered by a wired connection through an applicable port coupled to a power source.

Figure 4:
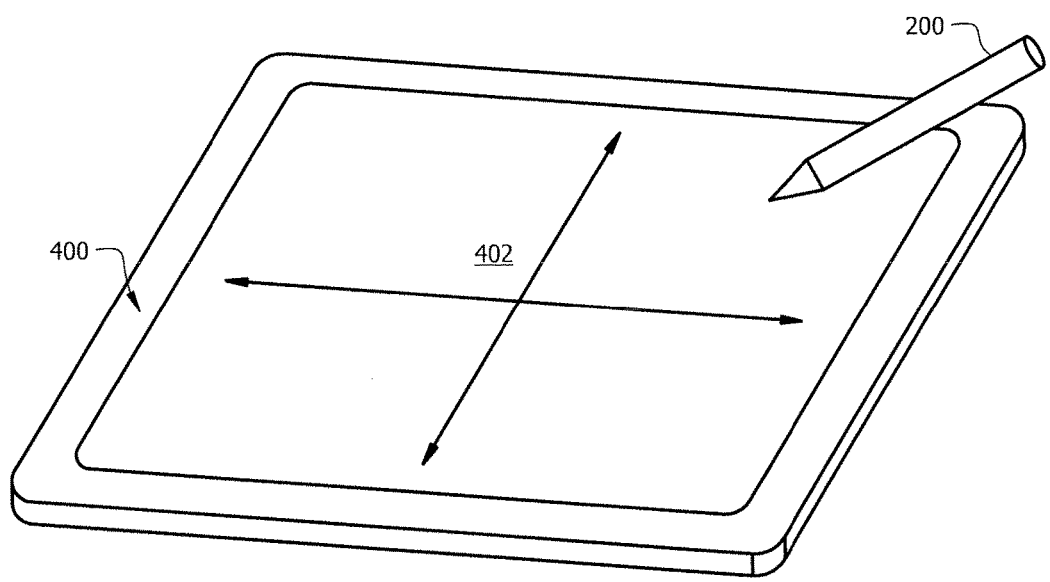
FIG. 4 illustrates an example stylus input to a device according to an embodiment of the present disclosure.

FIG. 4 illustrates an example stylus input to a device according to an embodiment of the present disclosure. Device 400 may have a display and a touch sensor array 100 with a touch-sensitive area 402. The display of device 400 is any type of display, such as a liquid crystal display (LCD), a LED display, a LED-backlight LCD display, an active-matrix organic LED (AMOLED) display, or other display, and may be visible though a cover panel and substrate (and the drive and sense electrodes of touch sensor array 100 disposed on it) of device 400. Although this disclosure describes a particular device display and particular display types, this disclosure contemplates any device display and any display types.

Device 400 electronics provide the functionality of device 400. For example, device 400 electronics may include circuitry or other electronics for wireless communication to or from device 400, execute programming on device 400, generating graphical or other user interfaces (UIs) for device 400 display to display to a user, managing power to device 400 from a battery or other power source, taking still pictures, recording video, other functionality, or any combination of these. Although this disclosure describes particular device electronics providing particular functionality of a particular device, this disclosure contemplates any device electronics providing any functionality of any device.

Touch sensor controller 102 of device 400 may operate in one or more modes. In one embodiment, with respect to stylus interaction, touch sensor controller 102 may operate in at least the following two modes: "stylus not detected" and "stylus detected." In the "stylus not detected" mode, touch sensor controller 102 may interleave or otherwise mix self-capacitance, mutual capacitance, and active stylus 200 "not detected" mode measurements to detect touch or proximity inputs, including, for example, the presence of active stylus 200 during the same measurement cycle. Each of these types of measurements may be used to detect certain types of inputs performed on or above touch-sensitive area 402. For example, touch sensor controller 102 may use self-capacitance measurements to detect certain touch or proximity inputs. In one embodiment, touch sensor controller 102 may use self-capacitance measurements to detect single-finger touches or large area palm touches. As another example, touch sensor controller 102 may use mutual capacitance measurements to detect certain touch or proximity inputs. In one embodiment, touch sensor controller 102 may use mutual capacitance measurements to detect multiple small touches or multi-touch input. As described below, touch sensor controller 102 may make the "stylus not detected" measurements using a modified self-capacitance measurement configured to provide position data of active stylus 200 above touch-sensitive area 402; however, the present disclosure contemplates touch sensor controller 102 making the "stylus not detected" measurements using any technique.

Although particular measurement types are described as being used to detect particular types of touch or proximity inputs, the present disclosure contemplates using any type of measurement to detect any type of touch or proximity input. For example, the present disclosure contemplates using any of the above-described measurement types to detect any type of touch or proximity input. As used herein, the terms "touch" and "proximity" may be used interchangeably to refer to both physical touches (e.g., of touch sensor array 100 or a cover layer overlaying touch sensor array 100) by an object (e.g., a finger, palm, stylus, or other object) and presence of an object (e.g., a finger, palm, stylus, or other object) within a detectable range of touch sensor array 100 where the object does not necessarily physically contact touch sensor array 100 (or a cover layer overlaying touch sensor array 100). For example, a touch or proximity input may refer to an input where an object is in physical contact with the cover panel of a device. Additionally or alternatively, a touch or proximity input may refer to detecting an object within a particular distance (e.g., hovering) over the cover panel (e.g., hovering).

In one embodiment, when touch sensor controller of device 400 has detected active stylus 200 within touch-sensitive area 402, touch sensor controller 102 may enter (or remain in, if appropriate) the "stylus detected" mode. In the "stylus detected" mode, touch sensor controller 102 may discontinue some measurements (e.g., self-capacitance and mutual capacitance, if appropriate) and perform measurements specific to communicating with active stylus 200. In one embodiment, the "stylus detected" mode may use a communication scheme between active stylus 200 and device 400 that includes a synchronization phase and a listen phase. For example, in the synchronization phase active stylus 200 may be synchronized to device 400 prior to the communication of other data between active stylus 200 and device 400. In one embodiment, this synchronization is performed through a synchronization ("sync") signal transmitted by the electrodes of touch-sensitive area 402 to active stylus 200. In one embodiment, the synchronization signal comprises a pre-determined bit sequence, e.g., a pulse wave. For example, the synchronization signal may be a square wave, sine wave, or any voltage waveform. Although particular techniques for interleaving or otherwise mixing different proximity detection modes are described, the present disclosure contemplates interleaving or otherwise mixing proximity detection modes according to any desired implementation.

In one embodiment, in the listen phase, active stylus 200 detects the synchronization signal and active stylus 200 responds with a communication signal (e.g., a series of pulses) onto which data is encoded. For example, touch sensor controller 102 may sample integrators connected to electrodes of touch-sensitive area 402 at pre-determined time intervals that correspond to the frequency of the synchronization signal. In one embodiment, the synchronization signal may initiate, provide for, or terminate the communication signal between active stylus 200 and one or more devices 400 or one or more users.

As a particular example of communication between the touch sensor and stylus 200, a header is a signal transmitted from touch controller 102 to stylus 200 via one or more electrodes 204. In one embodiment, a header includes one or more signal pulses upon which information is encoded. Stylus 200 listens for these pulses and responds once it has received a complete set of pulses (e.g., a complete "header"). In one embodiment, the response from stylus 200 includes one or more signal pulses upon which information is encoded for transmission to touch controller 102 via one or more electrodes 204.

When the housing of device 400 is held by the user, the electrodes of device 400 are capacitively coupled to the hand that is holding device 400 through the self-capacitance of the electrodes of device 400 and the body of the user. An object, such as a finger or stylus, in proximity to the electrodes defining touch-sensitive area 402 may initiate a transfer of an amount of charge between the object and the electrodes of device 400. Given the user is holding the outer body of active stylus 200, which is coupled to a local ground of active stylus 200, the user can couple a signal (e.g., a synchronization signal) transmitted by device 400 to the local ground of active stylus 200. For example, if the user places a large area touch (e.g., through a palm touch) located above the electrodes of touch sensor array 100 that receive the applied signal, the applied signal may be coupled into the local ground of active stylus 200 through the user holding device 400.

Figure 5A:
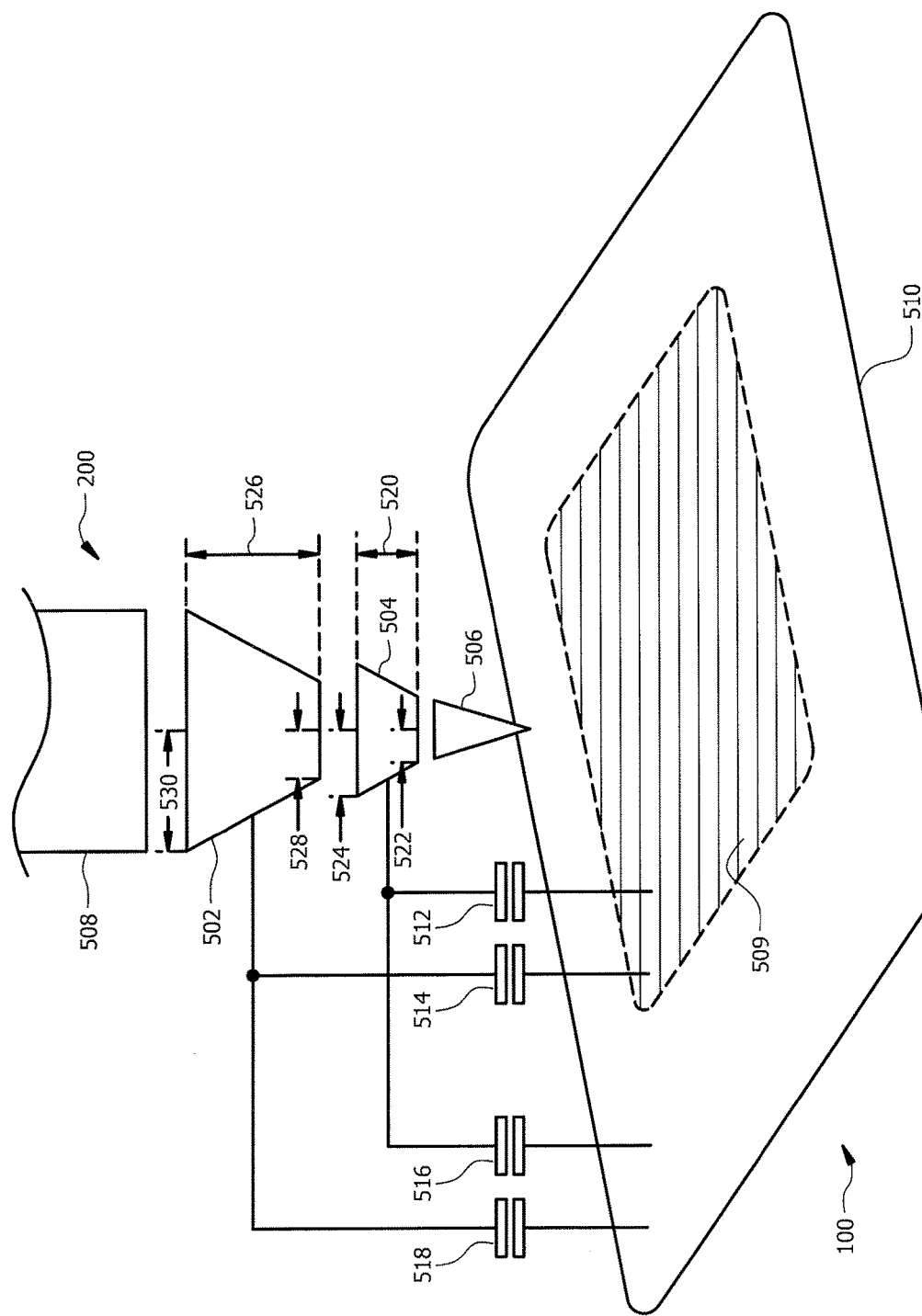
FIGS. 5A-5B illustrate a portion of an example active stylus in proximity to a touch sensor of a device according to an embodiment of the present disclosure.
Figure 5B:
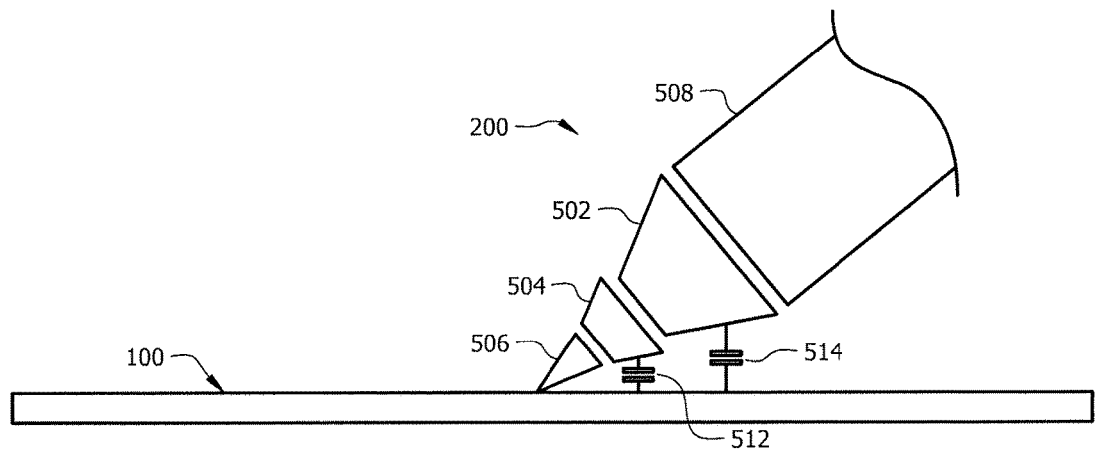

FIGS. 5A-5B illustrates a portion of an example active stylus 200 in proximity to a touch sensor 100 of a device according to an embodiment of the present disclosure. Only a portion of the tip-end of active stylus 200 is depicted, including a portion of stylus barrel 508, transmit electrode 506, first receive electrode 504, and second receive electrode 502. In an embodiment, electrodes 502, 504, and 506 would be housed within a tip assembly, which is not depicted in FIGS. 5A-5B. In the example of FIGS. 5A-5B, electrodes 502, 504, and 506 each have a generally conical shape. In particular, each electrode is a truncated cone (i.e., a section of a cone having a particular, height, top radius, and bottom radius). Although electrodes 502, 504, and 506 are depicted as solid, in some embodiments, the electrodes may not be entirely area-filling. For example, each electrodes may be formed of a shaped spring, whose outermost extent generally corresponds to the electrode shapes depicted in FIGS. 5A-5B. In an alternative embodiment to the one depicted in FIGS. 5A-5B, transmit electrode 506 and first receive electrode 504 may be replaced by a single electrode adapted to both transmit and receive signals.

In the preferred embodiment. first receive electrode 504 has a bottom radius 522 of 3 mm, a top radius 524 of between 3 and 5 mm (preferably 4.5 mm), and a height 520 of between 4 and 6 mm (preferably 5.8 mm). In the preferred embodiment, second receive electrode 502 has a bottom radius 528 of between 3 and 5 mm (preferably 3.38 mm), a top radius 530 of between 5 and 7 mm (preferably 6.08 mm), and a height 526 of between 6 and 10 mm (preferably 6.9 mm). In the preferred embodiment, the first receive electrode 504 and second receive electrode 502 are separated by an electrode gap 532 of between 0.1 and 1 mm, such as 0.5 mm.

In the example of FIG. 5A, capacitances 512, 514, 516, and 518 represent capacitive couplings between portions of active stylus 200 and touch sensor 100. Capacitance 512 represents a capacitive coupling between first receive electrode 504 and a first signal present on electrodes in a first portion 509 of touch sensor 100. The first signal may be a header signal or other synchronization signal. Capacitance 516 represents a capacitive coupling between first receive electrode 504 and a second signal present on electrodes in a second portion 510 of touch sensor 100. The second signal may be a ground reference of touch sensor 100. Alternatively, the second signal may be an inverted version of the first signal (i.e., the second signal may have reversed polarity compared to the first signal).

Capacitance 514 represents a capacitive coupling between second receive electrode 502 and the first signal present on electrodes in first portion 509 of touch sensor 100. Capacitance 518 represents a capacitive coupling between second receive electrode 502 and the second signal present on electrodes in second portion 510 of touch sensor 100.

In general, the strength of the depicted capacitive couplings (i.e., the magnitude of the capacitance) depends upon the area of the coupled portions and the distance between them. Increasing the surface area of a receive electrode will generally increase its capacitive coupling with touch sensor 100. Likewise, a smaller distance between the receive electrode and the touch sensor will generally increase its capacitive coupling with touch sensor 100. By selecting an appropriate size, shape, placement, and arrangement of the first receive electrode 504 and the second receive electrode 502, the relationships of between the depicted capacitive couplings can be optimized to maximize the quality of the received signal as output from differential amplifier 316.

In the preferred embodiment, capacitive coupling 512 is greater than capacitive coupling 514. In other words, first receiver 504 has a greater capacitive coupling to the first signal (such as a header signal) than does second receiver 502. The greater the difference between these couplings, the larger the difference between the magnitude of the header signal that will couple to each receiver. Increasing this difference improves the performance of differential amplifier 316 because it amplifies the difference between the signals received at the two electrodes.

In the preferred embodiment, the sum of capacitive couplings 512 and 516 is approximately equal to the sum of capacitive couplings 514 and 518. In other words, the total coupling of first receiver 504 to touch sensor 100 is approximately equal to the total coupling of second receiver 502 to touch sensor 100. Furthermore, in the preferred embodiment, first receiver 504 will have a coupling to the local stylus ground (not depicted) that is approximately equal to the coupling between second receiver 502 and the local stylus ground. As described above, signals may be injected into the local stylus ground by a user of the stylus. By matching the coupling to local stylus ground, approximately the same amount of injected signal should appear at both receive electrodes, allowing differential receiver 316 to substantially reduce or entirely cancel the injected signal, as well as other common noise that couples to the local stylus ground.

In the example of FIG. 5A, active stylus 200 is oriented at an angle of approximately 90 degrees relative to the surface of touch sensor 100. In the preferred embodiment, the above-described relationships between capacitive couplings may be achieved not only at approximately 90 degrees relative to the surface of touch sensor 100, but also over a range of angles up to and including approximately 45 degrees relative to the surface of touch sensor 100. In the depicted embodiment, the shapes and sizes of the first receive electrode 504 and second receive electrode 502 have been selected such that the widest portion of first receive electrode 504 has a greater width than portions of second receive electrode 502. For example, the top radius 524 of first receive electrode 504 is greater than the bottom radius 528 of second receive electrode 502. Thus, at an angle of approximately 90 degrees, the top portion of first receive electrode 504 at least partially shields the bottom portion of second receive electrode 502 relative to the portion of touch sensor 100 directly below the stylus tip, effectively reducing the area of second receive electrode 502 available to capacitively couple with touch sensor 100. However, as stylus 100 tilts away from 90 degrees toward 45 degrees, the degree of shielding provided by the wide portion of first receive electrode 504 decreases.

In the example of FIG. 5B, active stylus 200 is oriented at an angle of approximately 45 degrees relative to the surface of touch sensor 100. In this orientation, the distance between first receive electrode 504 and touch sensor 100 is much smaller than in FIG. 5A, which greatly increases capacitive coupling 512. In order to maintain the capacitive coupling relationships described above, there would need to be a corresponding increase in capacitive coupling 514. In the depicted example, this is achieved because as the stylus tilts away from 90 degrees, more and more of the bottom, narrow portion of second receive electrode 502 is exposed and available to capacitively couple to touch sensor 100.

Figure 6:
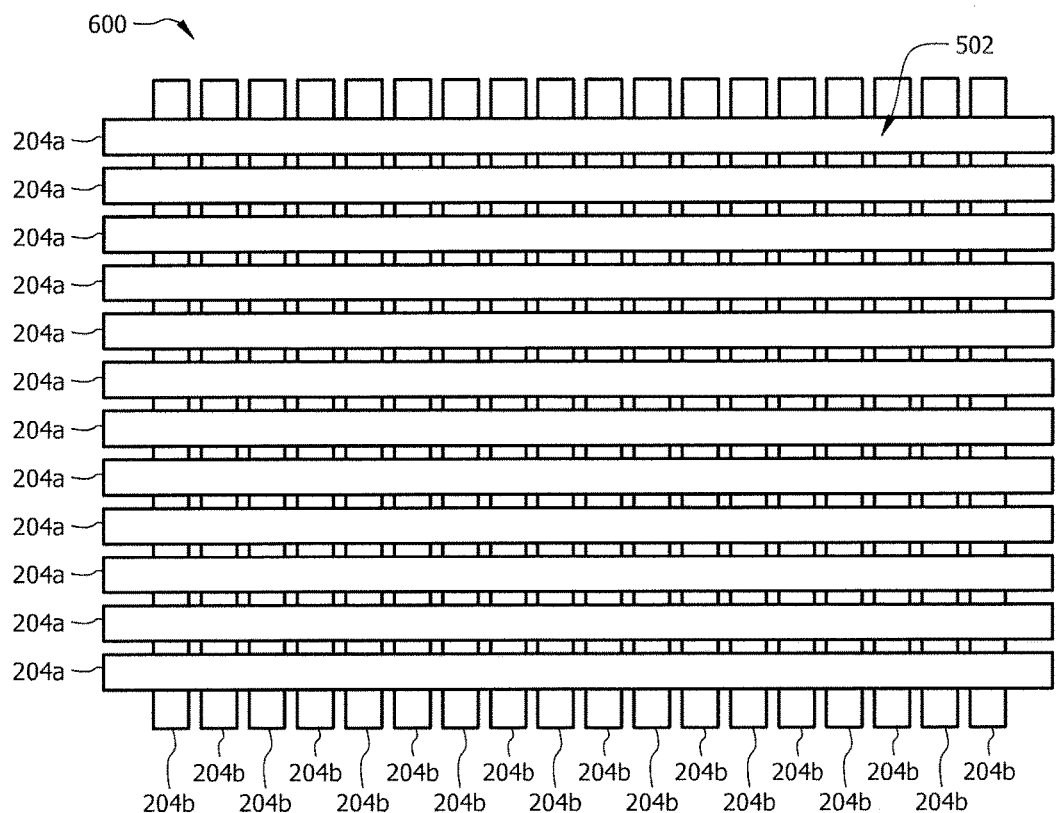
FIG. 6 illustrates in plan view an example arrangement of electrodes of a touch sensor according to an embodiment of the present disclosure.

FIG. 6 illustrates in plan view an example electrode pattern 500 of electrodes 204 of touch sensor array 100, according to an embodiment of the present disclosure. Electrodes 204a are oriented in a first direction and electrodes 204b are oriented in a second direction different from the first direction, such that touch-sensitive area 602 of touch sensor array 100 is defined by the two-dimensional array of electrodes 204a and electrodes 204b. In the illustrated example, the first direction and the second direction are perpendicular to each other. Electrodes 204a and electrodes 204b may be described based on their orientation in touch sensor array 100. For example, electrodes oriented along a horizontal direction (electrodes 204a in the illustrated example) may be referred to as x-electrodes and electrodes oriented along a vertical direction (electrodes 204b in the illustrated example) may be referred to as y-electrodes.

Electrodes 204a and electrodes 204b overlap at points along the electrodes. In a mutual capacitive mode of operation, capacitive nodes are formed at areas (e.g., area 26) where electrodes 204 overlap when one of electrodes 204a and 204b operates as a drive electrode and the other of electrodes 204a and 204b operates as a sense electrode and when a drive signal is applied to the electrodes 204 operating as drive electrodes.

In one embodiment, electrodes 204a and electrodes 204b are disposed on the same side of a substrate. In such embodiments, to ensure that electrodes 204a and electrodes 204b are electrically isolated from one another, electrodes 204a and electrodes 204b are separated by a dielectric or other material at points where electrodes 204a and electrodes 204b overlap. In certain other embodiments, electrodes 204a and electrodes 204b are disposed on opposing sides of a substrate, the substrate being made of a dielectric or other material that electrically isolates electrodes 204a and electrodes 204b from one another. In certain other embodiments, electrodes 204a and electrodes 204b are disposed on respective surfaces of different substrates, which are positioned with respect to each other such that electrodes 204a and electrodes 204b are electrically isolated from each other at points where electrodes 204a and electrodes 204b overlap. For example, one or more of the substrates may be positioned between electrodes 204a (positioned on one of the substrates) and electrodes 204b (positioned on the other of the substrates) or an additional substrate, such as a dielectric substrate, or air gap is sandwiched between the two substrates on which electrodes 204a and electrodes 204b are formed.

Although this disclosure describes a touch sensor including electrodes 204 having particular orientations, this disclosure contemplates any touch sensor with electrodes having any orientations. Additionally, the particular shapes and arrangement of electrodes 204 shown and described with respect to FIG. 6 are provided for example purposes only. The present disclosure contemplates electrodes 204 having any shapes (or combination of shapes) and any arrangement (or combination of arrangement).

In one embodiment, electrodes 204b operate as drive electrodes and electrodes 204a operate as sense electrodes. In other embodiments, electrodes 204a operate as drive electrodes and electrodes 204b operate as sense electrodes. In one embodiment, both electrodes 204a and electrodes 204b operate as sense electrodes. In one embodiment, a portion or all of electrodes 204a are configurable to operate as sense electrodes during some measurements and as drive electrodes during other measurements. Additionally or alternatively, in one embodiment, a portion or all of electrodes 204b are configurable to operate as sense electrodes during some measurements and as drive electrodes during other measurements. As an example, during a first mode of operation, a portion or all of electrodes 204a and a portion or all of electrodes 204b operate as sense electrodes and during a second mode of operation, a portion or all of electrodes 204b operate as drive electrodes and a portion or all of electrodes 204a operate as sense electrodes.

In one particular example implementation, in a stylus detection mode, a portion or all of both electrodes 204a and electrodes 204b operate as drive electrodes during a first phase in which a drive signal is applied to the electrodes and then operate as sense electrodes during a second phase in which touch sensor array 100 awaits a response from a stylus (e.g., stylus 200) in proximity to touch sensor array 100 (if a stylus is in proximity).

As described above, in the "stylus not detected" mode, touch sensor controller 102 may perform a modified self-capacitance measurement to determine the position of an stylus (e.g., stylus 200) in proximity to touch-sensitive area 402 defined by electrodes 204a and electrodes 204b. Touch sensor controller 102 may drive a set 106A of one or more electrodes 204 of touch sensor array 100 to transmit the applied signal, e.g., synchronization signal, to search for a stylus (e.g., stylus 200) in proximity to touch sensor array 100. The position of active stylus 200 may be determined by controller 102 transmitting a synchronization signal via electrodes 204 and "listening" for a signal transmitted by stylus 200 in response to stylus 200 receiving the synchronization signal. In one embodiment, touch sensor controller 102 may apply the synchronization signal to one or more electrodes 204. For example, the signal applied to electrodes 204a may include a number of pulses that have an amplitude that corresponds to a pre-determined peak voltage, such as a supply voltage. Although this disclosure describes techniques for locating and synchronizing with a stylus (e.g., stylus 200) using particular voltages, this disclosure contemplates any techniques for locating and synchronizing with a stylus using any voltages.

In one embodiment, controller 102 toggles between performing a measurement for detecting of the presence of a stylus using electrodes 204a and performing a measurement for detecting the presence of a stylus using electrodes 204b. Although this technique for detecting the presence of a stylus is described, the present disclosure contemplates applying drive signals (for detecting the presence of a stylus) in any manner and using any portion of electrodes 204.

Stylus 200, when in proximity to touch sensor array 100, may transmit a signal in response to the synchronization signal transmitted by touch sensor array 100. The response signal communicated by stylus 200 may be received by one or more electrodes 204a and one or more electrodes 204b of touch sensor array 100. Touch sensor controller 102 may process the received signal to determine a position of stylus 200. For example, touch sensor controller 102 may determine that stylus 200 is located in proximity to touch sensor array 100 at the position based on identifying one or more x-electrodes and y-electrodes receiving the largest amplitude signal from stylus 200. Although a particular technique for determining position is described, the present disclosure contemplates touch sensor controller 102 determining the position of stylus 200 according to any technique.

Figure 7:
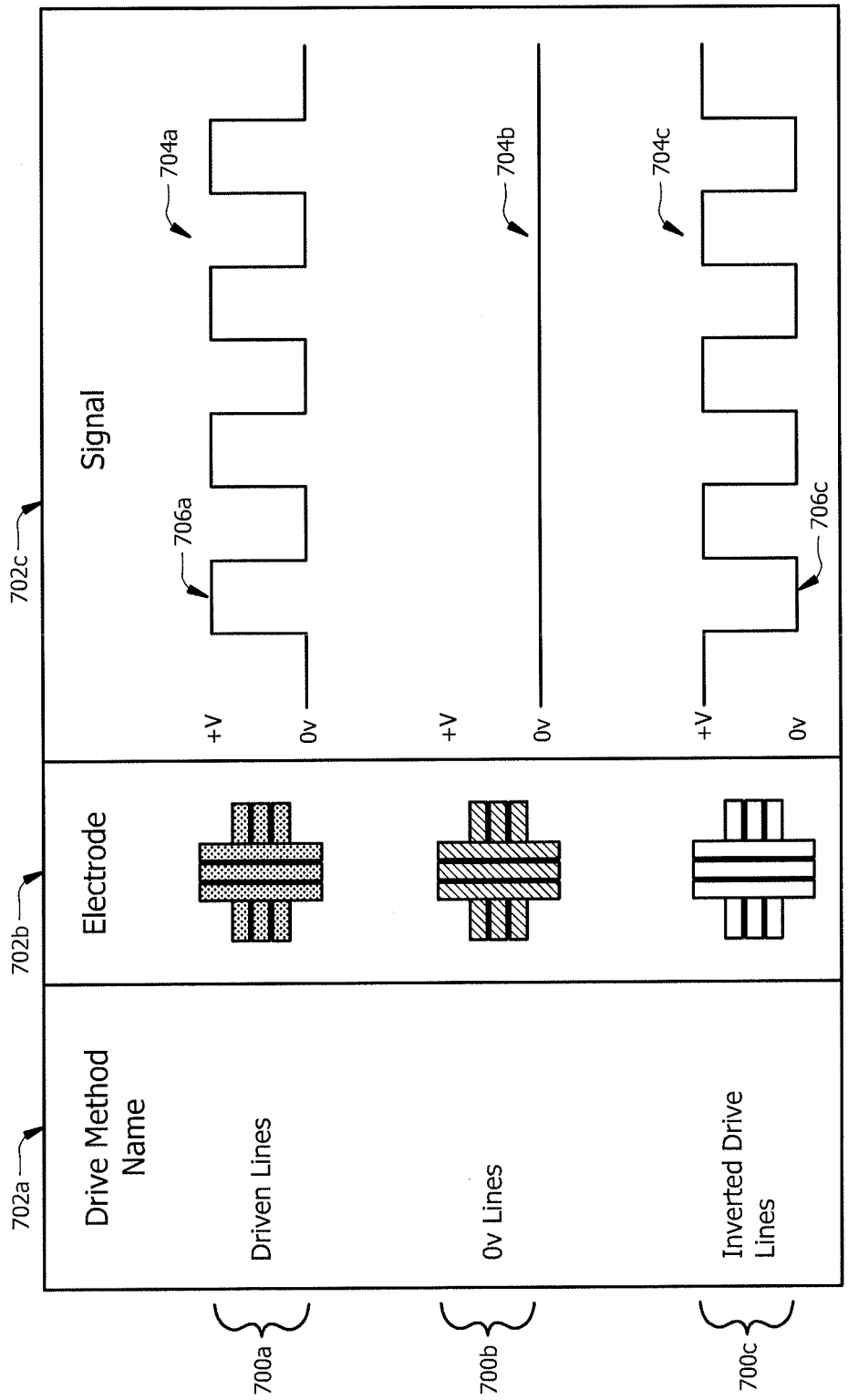
FIG. 7 illustrates example types of drive methods according to an embodiment of the present disclosure.

FIG. 7 illustrates example types of drive methods 700, according to an embodiment of the present disclosure. Drive methods 700 are used by controller 102, for example, to apply drive signals to a portion or all of electrodes 204. During each drive method 700, a particular voltage is applied, or no voltage is applied, for a time period. Example drive methods 700a, 700b, and 700c are described below. Column 702a identifies the name of the drive method. Column 702b identifies the fill type used to illustrate the associated drive method. For example, a dotted fill is used to represent drive method 700a, a striped fill is used to represent drive method 700b, and a no fill is used to represent drive method 700c. Column 702c includes an illustration of an example drive signal 704 for the associated drive method 700.

Drive method 700a represents an example drive method in which controller 102 applies a drive signal 704a having a first polarity to one or more electrodes 204. In an embodiment, controller 102 is configured to apply drive signal 704a to electrodes 204 to search for a stylus in proximity to touch sensor array 100.

Drive method 700b represents an example drive method in which controller 102 applies an unmodulated signal or a zero-volt signal 704b to one or more electrodes 204. For simplicity, drive signal 704b of drive method 700b is referred to as zero-volt signal 704b.

Drive method 700c represents an example drive method in which controller 102 applies a drive signal 704c having a second polarity to one or more electrodes 204. The second polarity of drive signal 704c is different than the first polarity of drive signal 704a. In one embodiment, the second polarity of drive signal 704c is the inverse of the first polarity of drive signal 704a such that drive signal 704c is an inverted drive signal 704 relative to drive signal 704a. For example, drive signal 704c includes a peak 706c that is an inverse of corresponding peak 706a of drive signal 704a. In one embodiment, drive signal 704c and drive signal 704a have the same waveform (e.g., having the same magnitudes and periods) but are polar opposites of one another. As a particular example, drive signal 704c and drive signal 704a are both square waveforms having the same magnitudes and periods, but are polar opposites of one another. For purposes of the present disclosure, drive signal 704c may be referred to as inverted drive signal 704c.

Embodiments of the present disclosure use some or all of these different drive methods 600 and corresponding drive signals 704 (drive signal 704a, zero-volt signal 704b, and inverted drive signal 704c to cause a stylus (e.g., stylus 200) to send different types of signals to be sensed by controller 102 on electrodes 204. For example, while electrodes 204 may typically be driven using drive method 700a (drive signal 704a having the first polarity) or drive method 700b (zero-volt signal 704b), it may be desirable to drive one or more electrodes 204 according to drive method 700c (using inverted drive signal 704c).

Although particular types of drive signals are illustrated and described, the present disclosure contemplates using any types of drive signals. For example, although particular patterns are illustrated and described, other patterns may be used. As a particular example, although square wave drive signals are shown, the present disclosure contemplates using sine wave drive signals. Additionally, the present disclosure contemplates using drive signals having any phase(s), frequency(ies), amplitude(s), number of pulses, and other characteristics.

Figure 8:
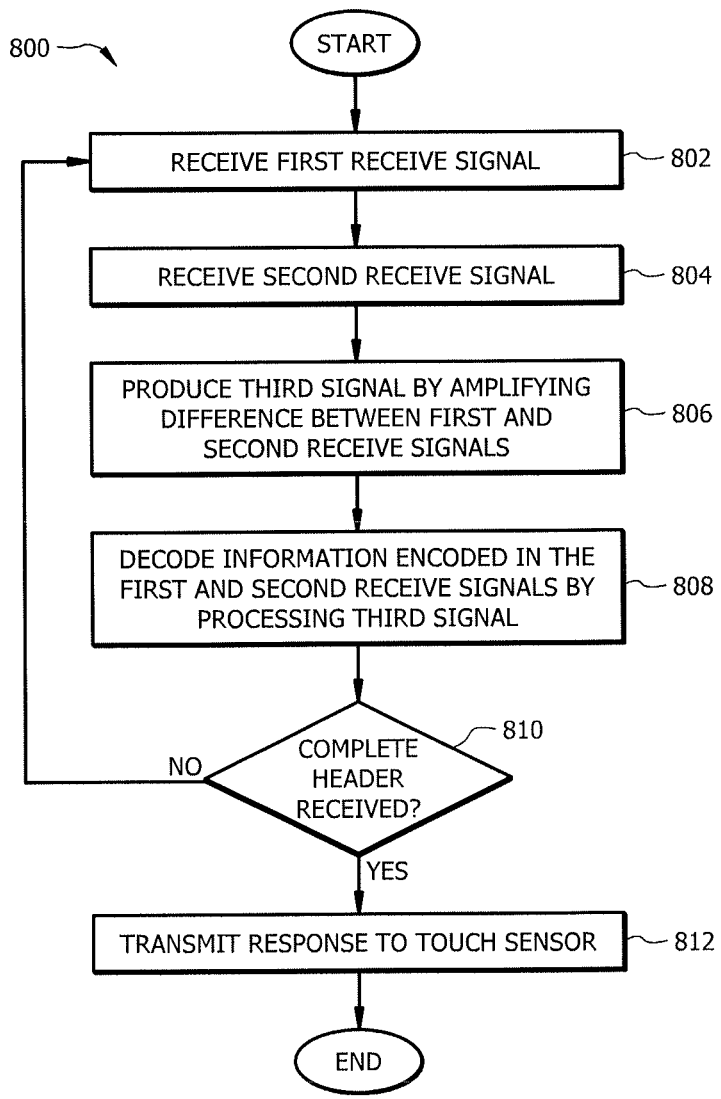
FIG. 8 illustrates an example method for receiving and processing signals from a touch sensor using an active stylus according to an embodiment of the present disclosure.

FIG. 8 illustrates an example method for receiving and processing signals from a touch sensor using an active stylus 200, according to an embodiment of the present disclosure. In one embodiment, some or all of these steps are performed while a touch sensor controller 102 of a device is in a stylus scan mode of operation of controller 102. As described above, the stylus scan mode may be interleaved or otherwise mixed with other modes of operation of controller 102.

At step 802, active stylus 200 receives a first receive signal from a touch sensor of a device via a capacitive coupling between the first receive electrode of the stylus and a signal generated by the touch sensor. For example, controller 102 may drive touch sensor electrodes 204 using drive method 700a with drive signal 704a. The drive signal 704 may be a header signal to cause stylus 200 to transmit a responsive signal. In one embodiment, the header signal includes one or more signal pulses upon which information is encoded.

At step 804, active stylus 200 receives a second receive signal from a touch sensor of a device via a capacitive coupling between the second receive electrode of the stylus and the signal generated by the touch sensor. As discussed above, the signal generated by the touch sensor may be a header signal. In an embodiment, the first receive electrode of the stylus has a greater degree of capacitive coupling to the header signal than does the second receive electrode of the stylus. As a result, the first receive signal may have a greater magnitude than the second receive signal. Thus, both the first receive signal and the second receive signals should include the header signal (with varying magnitude based on capacitive coupling) plus some noise. In an embodiment, steps 802 and 804 may occur simultaneously or sequentially but very close in time.

At step 806, active stylus 200 produces a third signal by amplifying the difference between the first receive signal and the second receive signal. Differential amplifier 316 takes the signals received by the first and second receive electrodes of the stylus as its positive and negative inputs, respectively. Any noise common to both the first receive signal and the second receive signal should be substantially reduced or eliminated. The header signal component should remain and be amplified, as both signals contain varying amounts of the header signal because of the differences in the capacitive coupling between the header signal and the two receivers. The resulting third signal is provided to stylus controller 302.

At step 808, active stylus 200 decodes information encoded in the first receive signal and second receive signal by processing the third signal. As discussed above, the third signal provides the header signal with additional noise reduced or removed. Stylus controller 302 uses the third signal to retrieve the information encoded on the pulses of the header signal.

At step 810, active stylus 200 determines whether it has received a complete header based at least in part on the decoded information. If not, the method returns to step 802 where the active stylus 200 continues to receive signals from the touch sensor of the device. If so, the method proceeds to step 812.

At step 812, active stylus 200 transmits a response to the touch sensor of the device. In one embodiment, the response from stylus 200 includes one or more signal pulses upon which information is encoded for transmission to touch controller 102 via one or more electrodes 204.

Although this disclosure describes and illustrates particular steps of the method of FIG. 8 as occurring in a particular order, this disclosure contemplates steps of the method of FIG. 8 occurring in any order. Particular embodiments may repeat one or more steps of the method of FIG. 8. Moreover, although this disclosure describes and illustrates an example method for receiving and processing signals from a touch sensor using an active stylus including the particular steps of the method of FIG. 8, this disclosure contemplates any method for receiving and processing signals from a touch sensor using an active stylus including any steps, which may include all, some, or none of the steps of the method of FIG. 8. Moreover, although this disclosure describes and illustrates particular components performing particular steps of the method of FIG. 8, this disclosure contemplates any combination of any components performing any steps of the method of FIG. 8.

Figure 9:
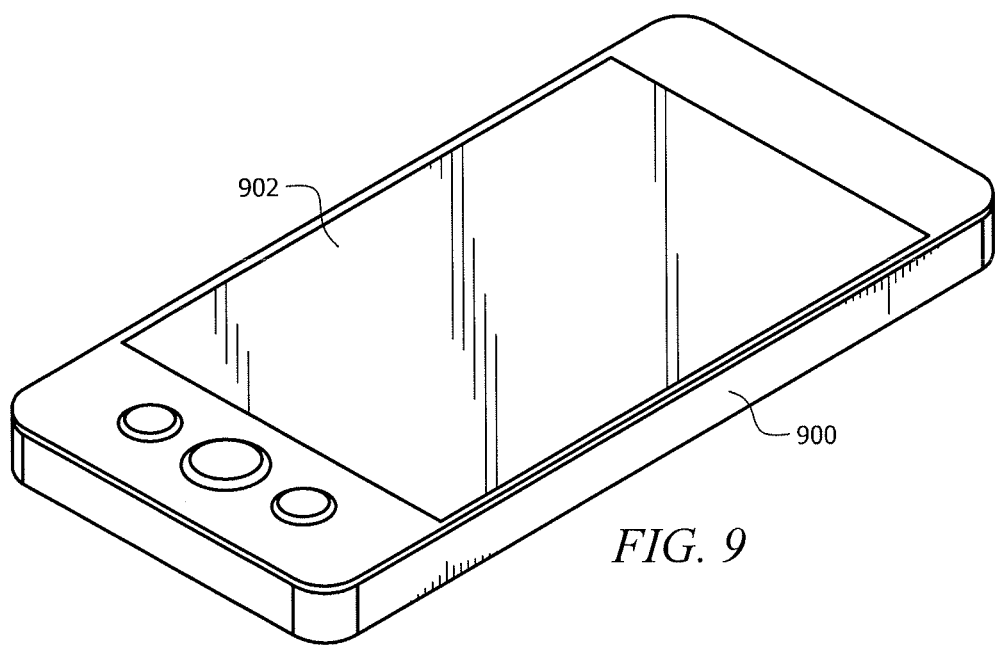
FIG. 9 illustrates an example device that uses the touch sensor of FIG. 1 according to an embodiment of the present disclosure.

FIG. 9 illustrates an example device 900 that uses touch sensor array 100 of FIG. 1, according to an embodiment of the present disclosure. Device 900 includes any personal digital assistant, cellular telephone, smartphone, tablet computer, and the like. In one embodiment, device 900 includes other applications such as automatic teller machines (ATMs), home appliances, personal computers, and any other such device having a touch screen. For example, a certain embodiment of device 900 is a smartphone that includes a touch screen display 902 occupying a significant portion of a surface of the device. In one embodiment, the large size of touch screen display 902 allows the touch screen display 902 to present a wide variety of data, including a keyboard, a numeric keypad, program or application icons, and various other interfaces as desired. In one embodiment, a user interacts with device 900 by touching touch screen display 902 with a stylus, a finger, or any other appropriate object in order to interact with device 900 (e.g., select a program for execution or to type a letter on a keyboard displayed on the touch screen display 902). In one embodiment, a user interacts with device 900 using multiple touches to perform various operations, such as to zoom in or zoom out when viewing a document or image. In some embodiments, such as home appliances, touch screen display 902 does not change or changes only slightly during device operation, and recognizes only single touches.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other computer-readable non-transitory storage media, or any combination of two or more of these. A computer-readable non-transitory storage medium may be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses a myriad of changes, substitutions, variations, alterations, and modifications to the example embodiments herein that a person having ordinary skill in the art would comprehend. Similarly, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A stylus comprising:
   a first sensor disposed proximate a first end of the stylus and adapted to receive a first receive signal via a first capacitive coupling between the first sensor and a first signal of a touch sensor of a device, the first end of the stylus being at a tip-end of the stylus; and
   a second sensor disposed proximate the first end of the stylus and adapted to receive a second receive signal via a second capacitive coupling between the second sensor and the first signal of the touch sensor of the device;
   wherein a proximity of the first sensor to the first end of the stylus is greater than a proximity of the second sensor to the first end of the stylus;
   wherein a widest portion of the first sensor has a greater width than at least a portion of the second sensor; and
   wherein the first and second sensors are provided such that a capacitance of the first capacitive coupling is larger than a capacitance of the second capacitive coupling, and such that a first sum of the capacitance of the first capacitive coupling and a capacitance of a third capacitive coupling between the first sensor and a first ground reference from the touch sensor of the device is approximately equal to a second sum of the capacitance of the second capacitive coupling and a capacitance of a fourth capacitive coupling between the second sensor and a second ground reference from the touch sensor of the device.

2. The stylus of claim 1, further comprising an amplifier coupled to the first and second sensors, the amplifier adapted to produce a third signal by amplifying a difference between the first receive signal and the second receive signal.

3. The stylus of claim 2, further comprising a controller configured to decode information encoded in the first receive signal and the second receive signal by processing the third signal.

4. The stylus of claim 1, wherein the first sensor has a generally conical shape with a width that generally decreases along a length of the stylus in a direction toward the first end of the stylus.

5. The stylus of claim 4, wherein the shape of the first sensor is a truncated cone.

6. The stylus of claim 5, wherein:
   a shape of the second sensor is a truncated cone with a width that generally decreases along a length of the stylus in a direction toward the first end of the stylus; and
   a largest radius of the first sensor is larger than a smallest radius of the second sensor.

7. The stylus of claim 1, wherein the second sensor has a generally conical shape with a width that generally decreases along a length of the stylus in a direction toward the first end of the stylus.

8. The stylus of claim 1, wherein the widest portion of the first sensor has a greater width than a narrowest portion of the second sensor.

9. The stylus of claim 8, wherein:
   the widest portion of the first sensor is at an end of the first sensor closest to the second sensor, and
   the narrowest portion of the second sensor is at an end of the second sensor closest to the first sensor.

10. The stylus of claim 1, wherein the first and second sensors are provided such that the first sum is approximately equal to the second sum at a first angle of approximately 90 degrees between the stylus and a surface of the touch sensor of the device and at a second angle of approximately 45 degrees between the stylus and the surface of the touch sensor of the device.

11. The stylus of claim 1, wherein the first and second sensors are provided such that the first sum is approximately equal to the second sum over a range of angles between the stylus and the surface of the touch sensor of the device, the range extending from approximately 90 degrees to approximately 60 degrees.

12. The stylus of claim 1, wherein the first and second sensors are provided such that the first sum is approximately equal to the second sum over a range of angles between the stylus and the surface of the touch sensor of the device, the range extending from approximately 90 degrees to approximately 45 degrees.

13. The stylus of claim 1, wherein a capacitive of a fifth capacitive coupling between the first sensor and a first ground reference of the stylus is approximately equal to a capacitance of a sixth capacitive coupling between the second sensor and a second ground reference of the stylus.

14. A method comprising:
    receiving, via a first capacitive coupling between a first sensor of a stylus and a first signal of a touch sensor of a device, a first receive signal, wherein the first sensor is disposed proximate a first end of the stylus, the first end of the stylus being at a tip-end of the stylus;
    receiving, via a second capacitive coupling between a second sensor of a stylus and the first signal of the touch sensor of the device, a second receive signal, wherein the second sensor is disposed proximate a first end of the stylus;
    producing a third signal by amplifying the difference between the first receive signal and the second receive signal; and
    decoding information encoded in the first receive signal and the second receive signal by processing the third signal;
    wherein a proximity of the first sensor to the first end of the stylus is greater than a proximity of the second sensor to the first end of the stylus;
    wherein a widest portion of the first sensor has a greater width than at least a portion of the second sensor; and
    wherein the first and second sensors are provided such that a capacitance of the first capacitive coupling is larger than a capacitance of the second capacitive coupling, and such that a first sum of the capacitance of the first capacitive coupling and a capacitance of a third capacitive coupling between the first sensor and a first ground reference from the touch sensor of the device is approximately equal to a second sum of the capacitance of the second capacitive coupling and a capacitance of a fourth capacitive coupling between the second sensor and a second ground reference from the touch sensor of the device.

15. The method of claim 14, wherein the first sensor has a generally conical shape with a width that generally decreases along a length of the stylus in direction toward the first end of the stylus.

16. The method of claim 15, wherein the shape of the first sensor is a truncated cone.

17. The method of claim 16, wherein:
a shape of the second sensor is a truncated cone with a width that generally decreases along a length of the stylus in a direction toward the first end of the stylus; and
a largest radius of the first sensor is larger than a smallest radius of the second sensor.

18. The method of claim 14, wherein:
the widest portion of the first sensor has a greater width than a narrowest portion of the second sensor;
the widest portion of the first sensor is at an end of the first sensor closest to the second sensor; and
the narrowest portion of the second sensor is at an end of the second sensor closest to the first sensor.

\* \* \* \* \*